US012265589B2

(12) United States Patent
Park et al.

(10) Patent No.: US 12,265,589 B2
(45) Date of Patent: Apr. 1, 2025

(54) METHOD FOR PROVIDING ADDRESS INFORMATION OF INTERNET RESOURCE USING DYNAMIC QR CODE, AND SYSTEM THEREOF

(71) Applicant: ARCH SEOUL CO., Ltd., Seoul (KR)

(72) Inventors: Sae Whan Park, Seoul (KR); Yu Mi Choi, Seoul (KR)

(73) Assignee: ARCH SEOUL CO., Ltd., Seoul (KR)

( * ) Notice: Subject to any disclaimer, the term of this patent is extended or adjusted under 35 U.S.C. 154(b) by 0 days.

(21) Appl. No.: 18/495,663

(22) Filed: Oct. 26, 2023

(65) Prior Publication Data

US 2025/0045342 A1 Feb. 6, 2025

(30) Foreign Application Priority Data

Aug. 4, 2023 (KR) .................. 10-2023-0101901

(51) Int. Cl.
    *G06F 16/95* (2019.01)
    *G06F 16/955* (2019.01)
    *G06F 16/958* (2019.01)
    *G06K 7/14* (2006.01)

(52) U.S. Cl.
    CPC ........ *G06F 16/9566* (2019.01); *G06F 16/972* (2019.01); *G06K 7/1417* (2013.01)

(58) Field of Classification Search
    None
    See application file for complete search history.

(56) References Cited

U.S. PATENT DOCUMENTS

| | | | |
|---|---|---|---|
| 2014/0110468 A1 | 4/2014 | Kandregula | |
| 2014/0117076 A1* | 5/2014 | Eberlein | G06F 16/9566 235/375 |
| 2018/0330346 A1* | 11/2018 | Grassadonia | G06Q 20/3278 |
| 2021/0350336 A1* | 11/2021 | Vanderveen | G06Q 40/08 |
| 2022/0269747 A1 | 8/2022 | Nguyen et al. | |

FOREIGN PATENT DOCUMENTS

| | | |
|---|---|---|
| KR | 10-2020-0000632 A | 1/2020 |
| KR | 10-2021-0032852 A | 3/2021 |
| KR | 10-2023-0007382 A | 1/2023 |

OTHER PUBLICATIONS

Office Action for KR 10-2023-0101901 by Korean Intellectual Property Office dated Aug. 6, 2024.
International Search Report for PCT/KR2023/018967 by Korean Intellectual Property Office dated Apr. 29, 2024.

* cited by examiner

*Primary Examiner* — Belix M Ortiz Ditren
(74) *Attorney, Agent, or Firm* — BROADVIEW IP LAW, PC

(57) ABSTRACT

Proposed is a method of providing internet resource address information using dynamic QR codes. In one embodiment, the method includes the following steps, receiving a first protocol request and extracts a QR code label identification number contained within the first URL from the received first protocol request, using the extracted QR code label identification number as a search key to retrieve redirection link address information from a QR code identification table, extracting redirection code information contained in the second URL upon receiving the forwarded second protocol request, and consulting the redirection link table using the extracted redirection code information as a search key to fetch the internet resource address information.

10 Claims, 11 Drawing Sheets

| Redirection Code Information(g1) | Internet Resource Address Information(g2) |
|---|---|
| ... | ... |
| 2001 | http://otherResourceService/forFirst |
| 2002 | http://otherResourceService/for20th |
| 2003 | http://otherResourceService/for30th |
| ... | ... |

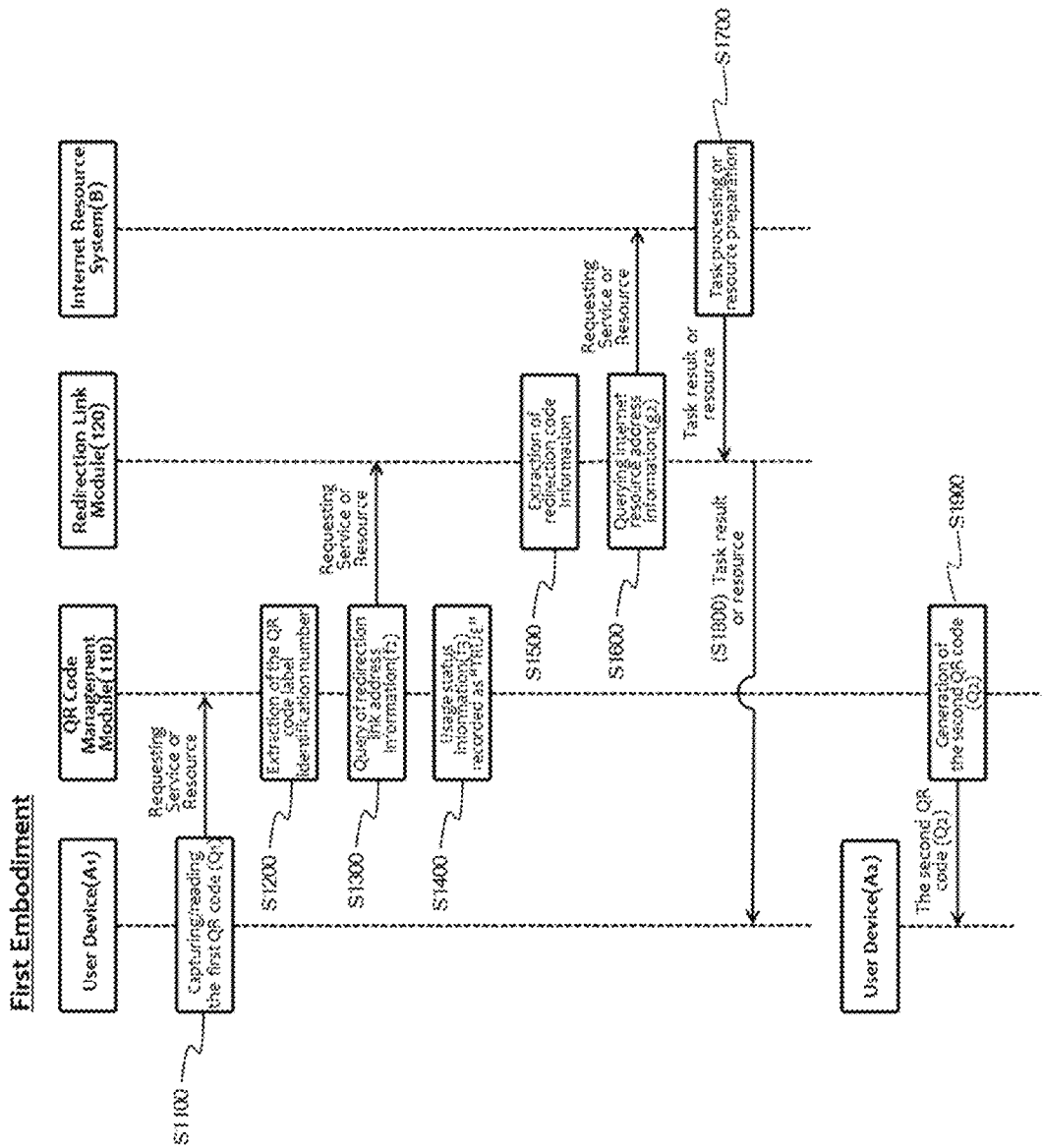

FIG. 4B

<T1 Before Change>

| QR Code Label Identification Number(f1) | Redirection Link Address Information(f2) | Usage Status Information(f3) |
|---|---|---|
| ... | ... | ... |
| 1001 | http://myRedirect.com/2001 | FALSE |

Q1 : URL includes "1001"

<T1 After Change>

| QR Code Label Identification Number(f1) | Redirection Link Address Information(f2) | Usage Status Information(f3) |
|---|---|---|
| ... | ... | ... |
| 1001 | http://myRedirect.com/2001 | TRUE |
| 1002 | http://myRedirect.com/2002 | FALSE |

Change

Generate

Q2 : URL includes "1002"

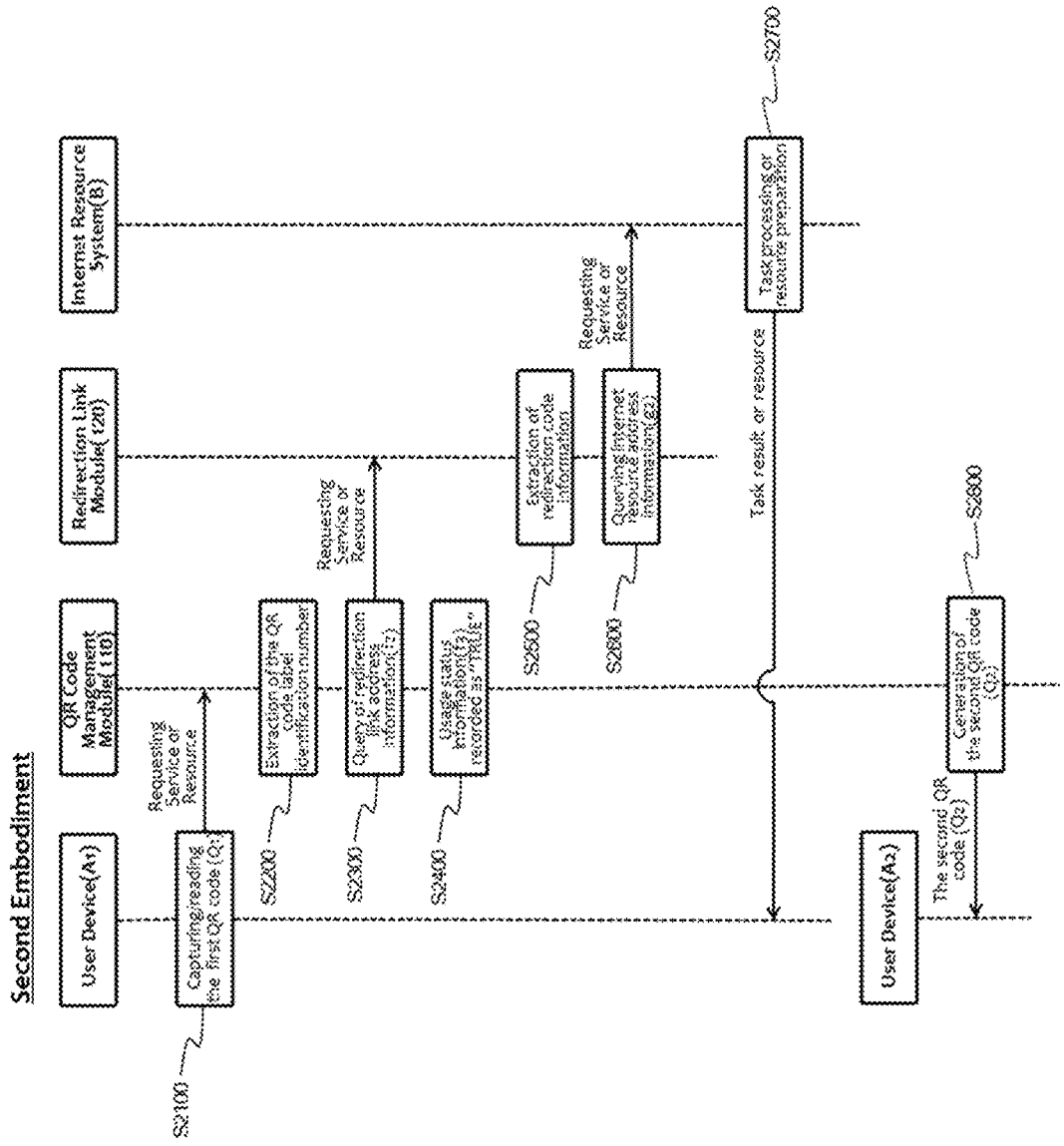

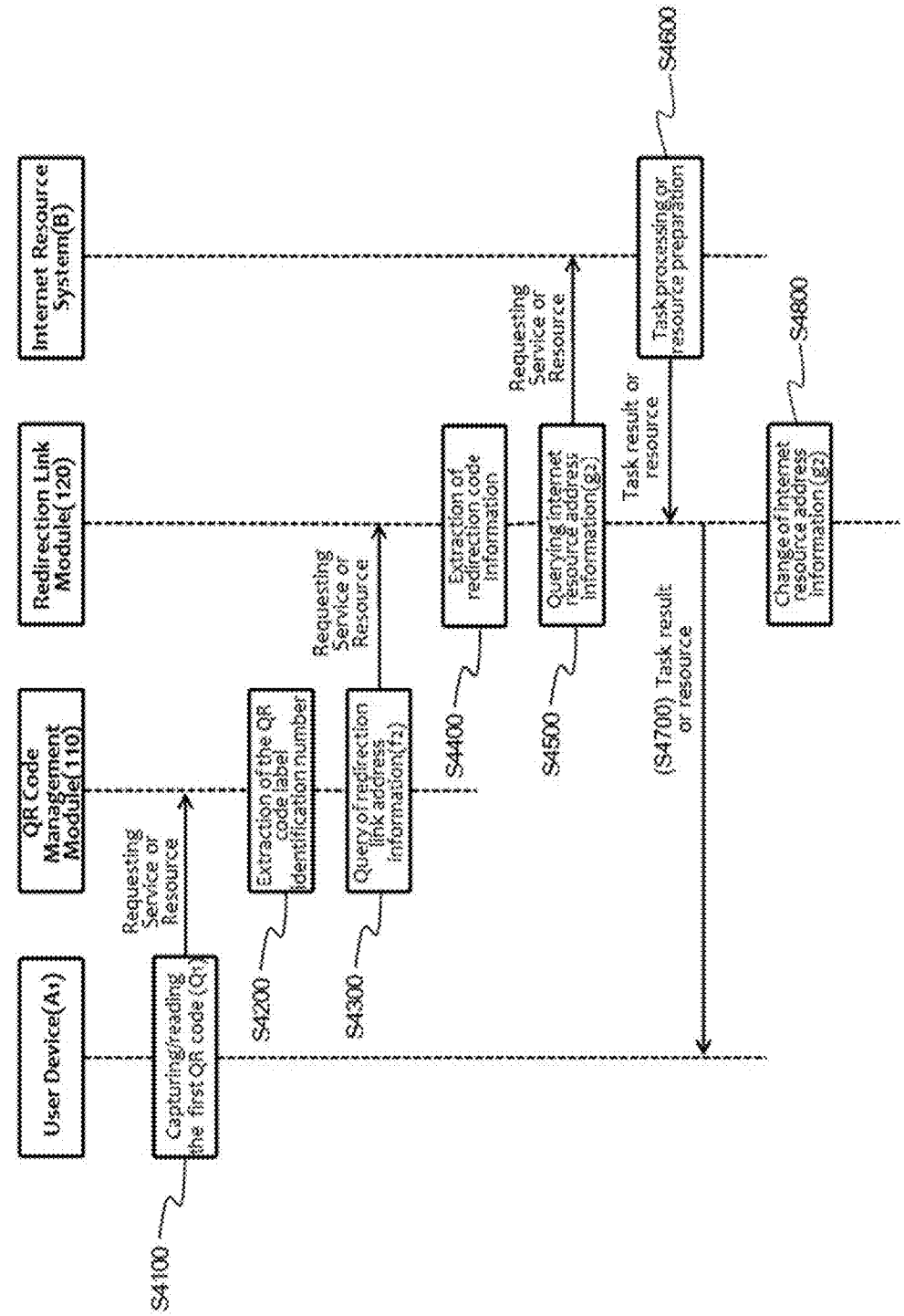

FIG. 7B

<T2 Before Change>

| Redirection Code Information(g1) | Internet Resource Address Information(g2) |
|---|---|
| ... | ... |
| 2001 | http://otherResourceService/forFirst |
| 2002 | http://otherResourceService/for20th |
| 2003 | http://otherResourceService/for30th |
| ... | ... |

<T2 After Change>

| Redirection Code Information(g1) | Internet Resource Address Information(g2) |
|---|---|
| ... | ... |
| 2001 | http://otherResourceService/forSecond |
| 2002 | http://otherResourceService/for20th |
| 2003 | http://otherResourceService/for30th |
| ... | ... |

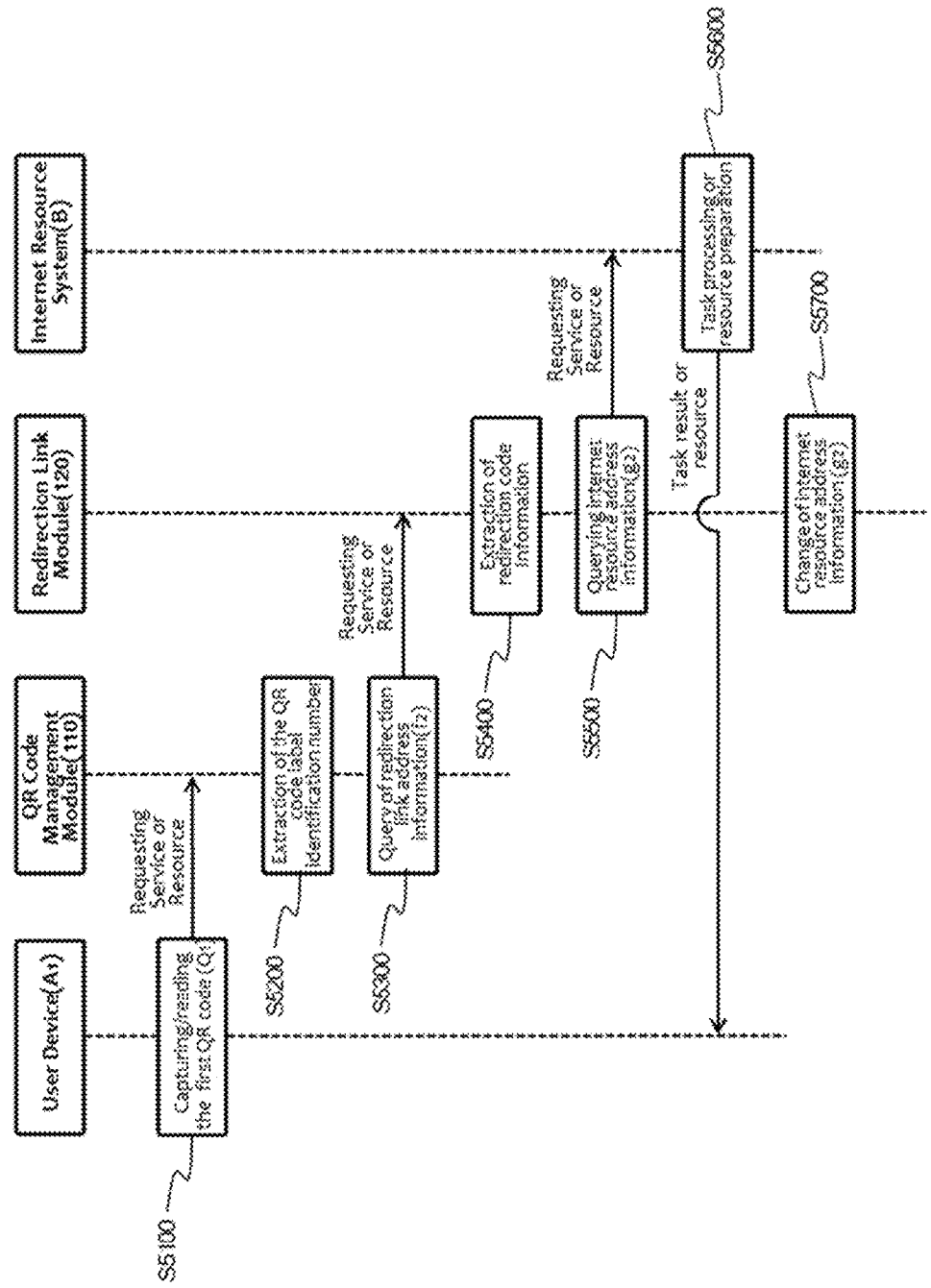

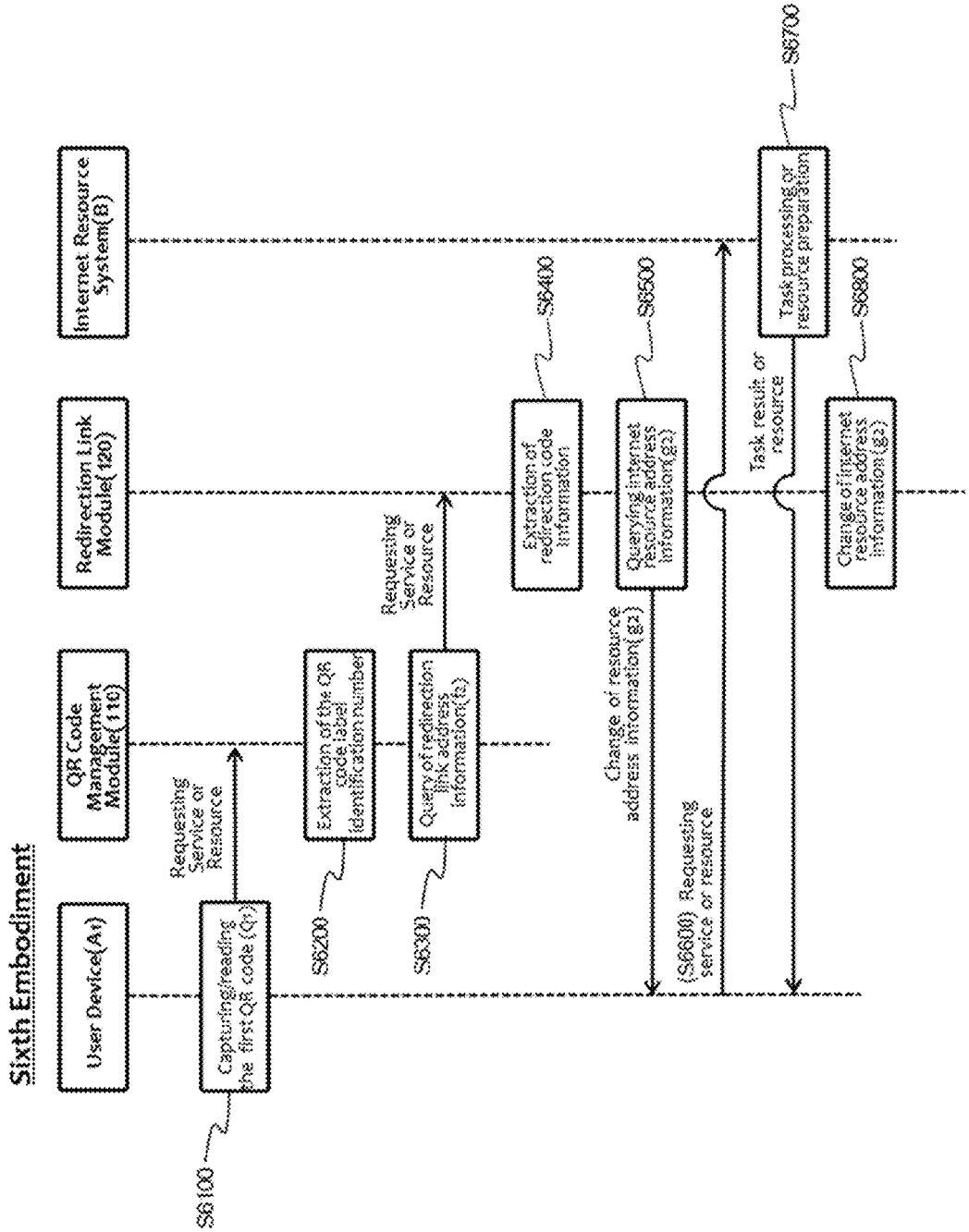

METHOD FOR PROVIDING ADDRESS INFORMATION OF INTERNET RESOURCE USING DYNAMIC QR CODE, AND SYSTEM THEREOF

CROSS REFERENCE TO RELATED APPLICATION

The present application claims priority to Korean Patent Application No. 10-2023-0101901, filed Aug. 4, 2023, the entire contents of which are incorporated herein for all purposes by this reference.

BACKGROUND

Technical Field

The present disclosure relates to a method for providing address information of internet resources using dynamic QR codes. More specifically, the present disclosure relates to a method for providing address information of resources such as text, web pages, images, videos, sound data, etc., located on the internet using dynamic QR codes that do not expose URL information. The present disclosure also relates to a method for providing address information of switched internet resources without changing the QR code when transitioning internet services.

Description of the Related Art

QR codes are a method of displaying information in the form of a 2-dimensional matrix. QR codes may store various types of information, including text, Uniform Resource Identifiers (URI), link to web pages, images, videos, or sound data, and more.

QR codes may be captured by cameras or optical recognition devices to acquire the information stored therein. With the proliferation of mobile devices such as smartphones and tablets, internet services using QR codes have been steadily increasing. For example, in cafes, customers may use their smartphones to generate QR codes, which cafe managers may scan to process payments and orders, among other uses.

Static QR codes directly store information within the code itself. However, static QR codes have the drawback that when the information stored therein needs to be changed, the QR code itself must also be changed, which may be cumbersome to use. There is also a security concern that when a QR code is leaked, the information contained therein is also exposed.

Dynamic QR codes store information in a separate location and store a Uniform Resource Identifier (URI), such as a URL, to indicate the location of the information. However, when the URL is changed to prevent unauthorized access to internet resources, the QR code storing the URL must also be changed. There is also an issue where even when the URL is changed, the changed URL may be easily discovered through brute-force attacks.

For example, in a cafe where customers change tables or in a hotel where guests change rooms, the web page's URL for ordering drinks in the cafe or room service in the hotel may be changed to uniquely identify the customer or the guests. However, it may not be possible to immediately change the QR code due to network connectivity issues at the QR code issuance intermediary device, resulting in delayed internet services.

SUMMARY

The purpose of the present disclosure is to provide a method and system for addressing the same problems as described above. Specifically, the present disclosure aims to provide a way to offer address information of internet resources without exposing URL information using dynamic QR codes.

Additionally, the present disclosure seeks to provide a method and system for delivering the changed address of internet resources without altering the QR code when transitioning between internet services.

To achieve the above objective, a method of providing internet resource address information using a dynamic QR code according to an embodiment of the present disclosure includes the following steps: A QR code management module receives a first protocol request, extracts a QR code label identifier number included in the first URL from the received first protocol request; the QR code management module, using the extracted QR code label identifier number as a search key, queries redirection link address information from a QR code identifier table and then forwards a second protocol request to a redirection link module; the redirection link module, from the forwarded second protocol request, extracts redirection code information included in the second URL; the redirection link module queries internet resource address information from a redirection link table using the extracted redirection code information as a search key.

In one embodiment, a user device captures a QR code containing the first URL, deciphers the first URL, and sends the first protocol request to the QR code management module located at the deciphered first URL.

In another embodiment, the QR code management module searches for a row in the QR code identifier table where the extracted QR code label identifier number matches, then queries the redirection link address information from the found row and forwards the second protocol request to the redirection link module located at the queried redirection link address information.

In yet another embodiment, the QR code management module checks the usage status information from the found row in the QR code identifier table. When the usage status is "FALSE", the QR code management module records as "TRUE" and forwards the second protocol request to the redirection link module. When the usage status is "TRUE", the first protocol request sent by the user device is rejected.

In another instance, the QR code management module generates a QR code label identifier number, adds a row containing the generated QR code label identifier number, corresponding redirection link address information, and initializes the usage status as "FALSE" in the QR code identifier table. The QR code management module then creates a QR code containing the generated QR code label identifier number and sends the QR code to an external device.

Furthermore, the redirection link module, referring to the redirection link table, searches for a row matching the extracted redirection code information and queries the internet resource address information from the found row.

In another scenario, the redirection link module modifies the internet resource address information in the found row of the redirection link table.

Lastly, the redirection link module sends the queried internet resource address information to the user device.

According to an embodiment of the present disclosure, the system that provides internet resource address information using a dynamic QR code includes:

1. QR Code Management Module: This module extracts the QR code label identification number included in the first URL from the first protocol request received from the user terminal device. Using the QR code label identification number as a search key, the QR code management module looks up the redirection link address information in the QR code identification table.

2. Redirection Link Module: This module extracts the redirection code information included in the second URL from the second protocol request forwarded from the QR code management module. Using the redirection code information as a search key, the redirection link module retrieves the internet resource address information from the redirection link table.

In one embodiment, the aforementioned QR code management module refers to the QR code identification table to search for a row with a value identical to the extracted QR code label identification number. After looking up the redirection link address information from the found row, the QR code management module forwards the second protocol request to the redirection link module located at the retrieved redirection link address information. Then, the QR code management module checks the usage information from the found row in the QR code identification table. When the checked usage information is "FALSE," the QR code management module records the usage information as "TRUE" and forwards the second protocol request to the redirection link module. However, when the checked usage information is "TRUE," the QR code management module denies the first protocol request sent by the user terminal device.

In another embodiment, the QR code management module generates a QR code label identification number. The QR code management module then adds a row to the QR code identification table that contains the generated QR code label identification number, corresponding redirection link address information, and usage information initialized to "FALSE." The QR code management module then creates a QR code containing the generated QR code label identification number and sends the QR code to an external terminal device.

In yet another embodiment, the redirection link module refers to the redirection link table to search for a row that has a value identical to the extracted redirection code information. Thereafter, the redirection link module looks up the internet resource address information from the found row and changes the internet resource address information in the searched row of the redirection link table.

In a further embodiment, the redirection link module sends the looked-up internet resource address information to the user's terminal device.

The present disclosure prevents the reuse of a QR code when switching services, thereby blocking unauthorized users from accessing internet resources. Additionally, the present disclosure may provide the address of the changed internet resource without altering the QR code, preventing delays in the service.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3B presents a simplified drawing of the redirection link table in an embodiment of the present disclosure.

FIG. 4A is a flowchart briefly outlining the process of providing internet resource address information using a dynamic QR code in the first embodiment of the present disclosure.

FIG. 4B depicts the changes in the QR code identification table during this process.

FIG. 5 illustrates a flowchart briefly representing the process of providing internet resource address information using a dynamic QR code in the second embodiment of the present disclosure.

FIG. 7A displays a flowchart briefly portraying the process of offering internet resource address information using a dynamic QR code in the fourth embodiment of the present disclosure.

FIG. 7B shows the changes in the QR code identification table and redirection link table during this process.

FIG. 8 presents a flowchart briefly describing the process of giving internet resource address information using a dynamic QR code in the fifth embodiment of the present disclosure.

FIG. 9 depicts a flowchart briefly representing the process of supplying internet resource address information using a dynamic QR code in the sixth embodiment of the present disclosure.

DETAILED DESCRIPTION

Figure 1:
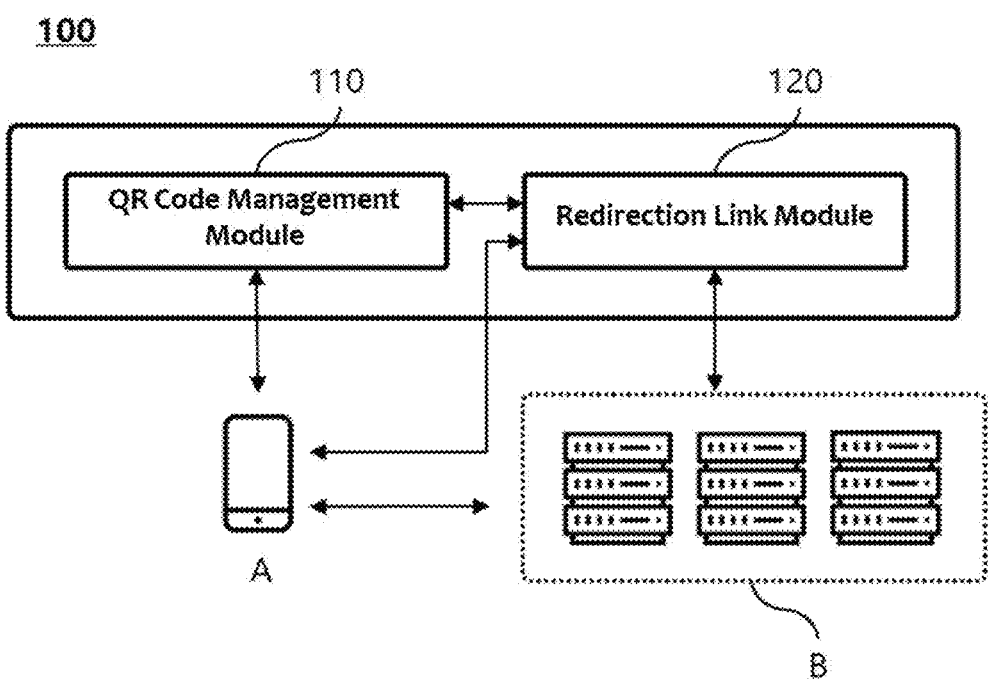
FIG. 1 illustrates a simplified drawing of a system that provides internet resource address information using a dynamic QR code according to an embodiment of the present disclosure, and the devices connected thereto.

Hereinafter, with reference to the accompanying drawings, embodiments of the present disclosure will be described in detail so that a person having ordinary knowledge in the technical field to which the present disclosure belongs may easily practice the embodiment. However, the present disclosure may be implemented in many different forms and is not limited to the embodiment described herein. In addition, in order to clearly describe the present disclosure, parts irrelevant to the description are omitted in the drawings, and similar reference numerals are given to similar parts throughout the specification.

Throughout the specification, when a part is said to be "connected (coupled, contacted, or combined)" with another part, this includes cases in which a part is not only "directly connected", but also "indirectly connected" with another member therebetween. In addition, when a component is said to "include" another component, this means that it may further include other components without excluding the other components unless otherwise stated.

Terms used in this specification are only used to describe specific embodiment, and are not intended to limit the present disclosure. Singular expressions include plural expressions unless the context clearly indicates otherwise. In this specification, terms such as "include" or "have" are intended to indicate that there is feature, number, step, operation, component, part, or combination thereof described in the specification, but it should be understood that the terms do not preclude the possibility of the presence or addition of one or more other features, numbers, steps, operations, components, parts, or combinations thereof.

Hereinafter, an apparatus and a method for emitting multi-wavelength lasers according to an embodiment of the present disclosure will be described with reference to the accompanying drawings.

FIG. 1 represents a schematic diagram of a system providing internet resource address information using dynamic QR codes according to an embodiment of the present disclosure, and devices connected thereto.

According to an embodiment of the present disclosure, the system (100) providing internet resource address information using dynamic QR codes connects with a user terminal device (A) and multiple internet resource systems (B) respectively.

The user terminal device (A) is a device that sends a message to the internet resource system (B) requesting the production, transportation of goods, or provision of services manipulated by a person and receives the result. Additionally, the user terminal device (A) sends or receives text, web pages, images, videos, sound data, and more to/from the internet resource system (B). The user terminal device (A) may be an example of devices such as smartphones, tablet computers, desktop computers, or laptop computers. The user terminal device (A) may also be any terminal device equipped with a data communication function.

Furthermore, after capturing a QR code, the user terminal device (A) sends a message to the system (100) according to an embodiment of the present disclosure, requesting the provision of internet resource address information on a computer network. Alternatively, the user terminal device (A) may send a message to the system (100) according to an embodiment of the present disclosure, instructing the system to send a message to the internet resource system (B) requesting the production, transportation of goods, or provision of services. After the system (100) receives the results from the internet resource system (B), the system (100) relays this information back to the user terminal device (A).

The multiple internet resource systems (B) store resources such as text, web pages, images, videos, and sound data. When the internet resource systems (B) receive request messages from either the user terminal device (A) or the system (100) according to an embodiment of the present disclosure, these internet resource systems (B) process the requested tasks. After processing, the systems (B) send the results or the resources directly possessed therein either to the user terminal device (A) or to the system (100). For instance, the multiple internet resource systems (B) may each comprise a set of one or more server computers.

The system (100) according to this embodiment of the present disclosure receives a message requesting the computer network address information of the internet resource system (B) from the user terminal device (A), and sends the computer network address information of the internet resource system (B) to the user terminal device (A). Additionally, the system (100) sends a message to the internet resource system (B) requesting the production or transportation of goods, or the provision of services, receives the result, and then forwards the result to the user terminal device (A).

The system (100) according to this embodiment of the present disclosure stores the computer network address information of the internet resource system (B). Additionally, the system (100) according to this embodiment of the present disclosure stores data that includes the relationship between the redirection link address information and the internet resource address information. The redirection link address information represents the computer network address of a device or system located between the user terminal device (A) and the internet resource system (B) that forwards data. Furthermore, the system (100) according to this embodiment of the present disclosure stores data that includes the relationship between the QR code label identification number and the redirection link address information. The QR code label identification number may be a number or letter that is an integer to distinguish the generated QR code from other QR codes, or the QR code label identification number may be a combination of numbers and letters.

According to one embodiment of the present disclosure, the system (100) generates a new QR code label identification number and creates associated redirection link address information. Additionally, the system (100) according to this embodiment creates a QR code based on a URL information, which is a combination of the QR code root address information and the QR code label identification number, and sends this to the user terminal device (A). The QR code root address information could be the URL information of a component of the system (100) according to this embodiment that receives requests from the user terminal device (A).

In one embodiment of the present disclosure, the QR code generated by the system (100) and captured by the user's terminal device may be of one of the following standards: Model 1 or Model 2. Micro QR code, iQR code, SQRC, or Frame QR. Additionally, a QR code may be generated and read according to these standards.

In one embodiment of the present disclosure, the system (100) includes a QR code management module (110) and a redirection link module (120). Both the QR code management module (110) and the redirection link module (120) may be individual computing devices, or the modules (110, 120) may contain one or more computing devices. Alternatively, one or more computing devices may execute the functions of the QR code management module (110) and the redirection link module (120).

Figure 2:
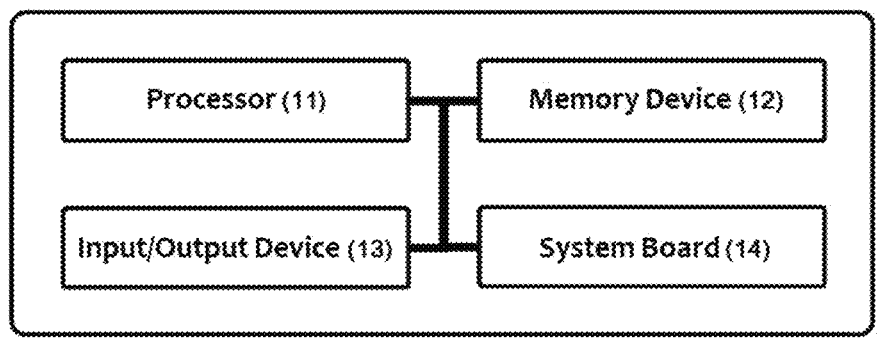
FIG. 2 is a block diagram briefly depicting a computing device in the system according to an embodiment of the present disclosure.

FIG. 2 is a block diagram that briefly illustrates a computing device in the system according to one embodiment of the present disclosure.

In one embodiment of the present disclosure, the system (100) includes or is incorporated into a computing device (10) which comprises a processor (11), a memory device (12), input/output device (13), and a system board (14).

The processor (11) processes data entering or exiting the system (100) of this embodiment of the present disclosure. The processor (11) may be a microprocessor containing a control unit, arithmetic logic unit, registers, and cache memory. For example, the processor could be a central processing unit (CPU), a graphics processing unit (GPU), or a digital signal processor (DSP). The processor may also have a multi-core structure.

The memory device (12) stores data processed internally by the system (100) of this embodiment. The memory device (12) may include primary and secondary memory. The primary memory may consist of random access memory (RAM) devices or flash memory devices. For instance, the primary memory could be a RAM device, which may include one or more of the following: SRAM (static RAM), DRAM (dynamic RAM), MRAM (magneto-resistive RAM), STT-MRAM (spin-transfer torque magneto-resistive RAM), PRAM (phase change RAM), RRAM (resistive RAM), and FeRAM (ferroelectric RAM). The secondary memory may include one or more of the following: a hard disk drive (HDD), a solid state drive (SSD), an optical disc drive, or magnetic tape.

The input/output device (13) receives data into the system (100) of this embodiment of the present disclosure and outputs data externally. The input/output device may include an external I/O port and its corresponding driver device. For example, the external I/O port may include one or more of the following: serial port, parallel port, SCSI (small computer system interface), USB (universal serial bus), IEEE 1394, e-SATA (external serial advanced technology attachment), and thunderbolt. Moreover, the input/output device may include a network interface controller (NIC). This NIC may be connected to a local area network (LAN) based on ethernet through a wired method or may be connected to a wireless local area network (WLAN) based on Wi-Fi through a wireless method.

The system board (14) connects the processor, memory device, and input/output device, and provides a data pathway in the system (100) according to this embodiment of the present disclosure. The system board may include an address bus, command bus, data bus, chipset device controlling the buses, and a power system.

The system (100) according to this embodiment of the present disclosure may be connected to user terminal device (A) and internet resource system (B), as well as personal area network (PAN), local area network (LAN), metropolitan area network (MAN), and wide area network (WAN). Using data communication protocols such as TCP/IP (transmission control protocol/internet protocol), SMB (server message block), CIFS (common internet file system), and NFS (network file system), the system (100) may receive data from the user terminal device (A) and internet resource system (B) or transmit data to the user terminal device (A) and internet resource system (B).

Figure 3A:
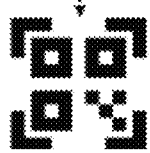
FIG. 3A shows a simplified drawing of the QR code identification table in an embodiment of the present disclosure.

FIG. 3A is a diagram briefly showing the QR code identification table in this embodiment of the present disclosure.

The QR code management module (110) includes a QR code identification table (T1). The QR code identification table (T1) is data that includes the relationship between the QR code label identification number and the redirection link address information, indicating which redirection link address corresponds to a given QR code label identification number. The QR code identification table (T1) may be in a matrix form consisting of rows and columns. For each row, the QR code label identification number (f1), its corresponding redirection link address information (f2), and usage status information (f3) may be located in each column. The QR code management module (110) may save the QR code identification table (T1) as a file or store the QR code identification table (T1) by building a relational database.

In the QR code identification table (T1), the QR code label identification number (f1) is information to differentiate the QR code generated to provide to the user terminal device (A) from other QR codes. The QR code label identification number (f1) may be a number that's an integer, a string, or a combination of both numbers and characters.

The QR code management module (110) may combine its address information on the computer network with the QR code label identification number (f1) and then generate a QR code. The address information of the QR code management module (110) on the computer network may be an address according to the Internet Protocol, such as IPv4 or IPv6, or the address information may be a URL. For example, the QR code management module (110) may combine its own URL "http://www.ModuleForManagingQrCode.com" with the QR code label identification number (f1) "1001" to create the URL "http://www.ModuleForManagingQrCode.com/1001", and then generate a QR code.

The redirection link address information (f2) contains the network address information (for example, IPv4 or IPv6 address, URL) of the computing device contained in the redirection link module (120), as well as the redirection code information. The redirection code information is data that the redirection link module (120) retains to identify when forwarding protocol requests to the internet resource system (B).

Usage status information (f3) records whether the QR code containing the QR code label identification number (f1) has been used. The usage status information (f3) is of the "Boolean" data type and may have either a "TRUE" or "FALSE" value. For example, when "TRUE" is recorded in the usage status information (f3), the QR code management module (110) may deny protocol requests sent using the QR code that was created containing the QR code label identification number (f1) recorded in that row. A protocol request may be for a URL included in the QR code, requesting resources like text, web pages, images, videos, sound data, etc. Alternatively, a protocol request may be an action executed in computer-readable commands to send a message requesting the production, transportation of goods, or provision of services via a URL contained in the QR code.

User terminal device (A) captures or senses the QR code created by the QR code management module (110) using a camera or another optical recognition device. After detecting the URL contained in the QR code, the user terminal device (100) sends a protocol request to that URL. For instance, the user terminal device (A) may send an HTTP (hypertext transfer protocol) or HTTPS (HTTP secure) request to the detected URL. The QR code management module (110) extracts the QR code label identification number contained in the URL specified when the user terminal device (A) sends the protocol request. The QR code management module (110) refers to the QR code identification table (T1) to find a row with the extracted QR code label identification number. After finding the row, the QR code management module (110) looks up the redirection link address information and forwards the protocol request to the redirection link module located at that redirection link address. Then, the QR code management module (110) records "TRUE" in the usage status information (f3) of the found row. Furthermore, when "TRUE" is recorded in the usage status information of the found row in the QR code identification table, the QR code management module (110) may deny the protocol request sent by the user terminal device.

Additionally, the QR code management module (110) may generate a QR code label identification number. The QR code management module (110) may add a row to the QR code identification table that includes the generated QR code label identification number, redirection link address information corresponding to it, and usage status information initialized to "FALSE". The module may also create a QR code containing the generated QR code label identification number and send the QR code to external devices (for example, terminals installed on a store's table or a user's terminal device).

FIG. 3B is a simplified diagram of the redirection link table in one embodiment of the present disclosure.

The redirection link module (120) includes a redirection link table (T2). This table (T2) contains data representing the relationship between redirection link address information and internet resource address information. The data contained in the table (T2) specifies which internet resource address corresponds to a specific redirection link address. The redirection link table (T2) may be in the form of a matrix with rows and columns, with each row containing redirection code information (g1) and its corresponding internet resource address information (g2) in separate columns. The redirection link module (120) may save the redirection link table (T2) as a file or maintain the redirection link table (T2) in a relational database.

Redirection code information (g1) is the information used to identify the delivery address when the redirection link module (120) forwards protocol requests to the internet resource system (B) based on the redirection link address information. The redirection code information (g1) may be an integer, a string, or a combination of numbers and characters.

Internet resource address information (g2) may be the address of texts, web pages, images, videos, sound data, etc., located in the internet resource system (B). Alternatively, the internet resource address information (g2) may be the address of a set of procedures in the internet resource system (B) that handle tasks when users request the production, transportation of goods, or provision of services through the user terminal device (A). The internet resource address information (g2) may be an IPV4 or IPv6 address or a URL.

When the QR code management module (110) extracts the redirection code information from the URL of the sent protocol request, the redirection link module (120) references the redirection link table (T2). The QR code management module (110) searches for the internet resource address information (g2) corresponding to the extracted redirection code information and forwards the protocol request to the found internet resource address information (g2). After receiving the protocol request, the internet resource system (B) processes the task according to the request and sends the process result or resources to the redirection link module (120). The redirection link module (120) then sends the result or resources to the user terminal device (A).

Alternatively, the Redirection Link Module (120) extracts redirection code information from the URL to which the QR Code Management Module (110) sent a protocol request. By referencing the Redirection Link Table (T2), the redirection link module (120) searches for the internet resource address information (g2) corresponding to the extracted redirection code information and sends this to the user terminal device (A). The user terminal device (A) sends a protocol request directly using the received internet resource address information (g2) and receives either the processing result of the request or resources held by the Internet Resource System (B).

FIG. 4A is a flow chart briefly showing the process of providing internet resource address information using a dynamic QR code in the first embodiment of the present disclosure. FIG. 4B briefly depicts changes in the QR code identification table during that process.

In the first embodiment, the first customer is a customer requesting a service at any time, and the second customer is the one requesting service immediately after the first customer.

The first customer photographs the first QR code (Q1) generated by the QR Code Management Module (110) using his/her user terminal device (A1). After reading the URL from the photographed first QR code (Q1), the user terminal device (A1) sends a protocol request to the QR Code Management Module (110) located at the read URL (Step S1100). The protocol request might be, for instance, an HTTP or HTTPS request to receive text, web pages, images, videos, sound data, etc., from the Internet Resource System (B). Alternatively, the protocol request might be to request the production, transportation of goods, or provision of services from the Internet Resource System (B).

The QR Code Management Module (110) extracts the URL and the QR code label identification number contained in the received protocol request (Step S1200). For instance, when the URL read and photographed by the user terminal device (A1) in Step S1100 is "http://www.ModuleForManagingQrCode.com/1001", the QR Code Management Module (110) may extract the URL and identify "1001" as the QR code label identification number.

The QR Code Management Module (110) refers to the QR Code Identification Table (T1), searches for a row with a value matching the extracted QR code label identification number, retrieves redirection link address information (f2) from the found row, and forwards the protocol request to the Redirection Link Module (120) located at the address (Step S1300).

The QR Code Management Module (110) records the usage information (f3) in the searched row of the QR Code Identification Table (T1) as "TRUE" (Step S1400). Even when the first, second, or another customer photographs the first QR code (Q1) again and sends a protocol request, the QR Code Management Module (110) may decline the protocol request. In other words, when "TRUE" is recorded in the use information of the searched row in the QR Code Identification Table (T1), the QR Code Management Module (110) may reject the protocol request sent by the user terminal device.

The Redirection Link Module (120) extracts the URL and redirection code information contained in the forwarded protocol request (Step S1500). For example, the Redirection Link Module (120) may extract the URL "http://myRedirect.com/2001" and identify "2001" as the redirection code information.

The Redirection Link Module (120) refers to the Redirection Link Table (T2), searches for a row with a value matching the extracted redirection code information, retrieves the internet resource address information (g2) from the found row, and sends a protocol request to that internet resource address. (Step S1600)

The Internet Resource System (B) receives the protocol request, processes the received protocol request according to the request, and sends either the result data from the operation or resources held therein to the Redirection Link Module (120). (Step S1700)

The Redirection Link Module (120) then sends the received data or resources from the Internet Resource System (B) to the first customer's user terminal device (A1). (Step S1800)

In the first embodiment, by preventing the reuse of a redirection code and corresponding QR code, it is possible to block other customers or users from using an already utilized QR code.

The QR Code Management Module (110) adds a row to the QR Code Identification Table (T1) that includes the generated QR code label identification number, corresponding redirection link address information, and usage status information initialized as "FALSE". The QR Code Management Module (110) also generates a second QR code (Q2) containing the generated QR code label identification number and sends the second QR code (Q2) to the second customer's user terminal device (A2). (Step S1900)

The redirection link address information corresponding to the generated QR code label identification number may include the address of the Redirection Link Module (120) that forwards protocol requests to the Internet Resource System (B) for service or resources for the second or other customers. Step S1900 may be executed during or even before executing steps S1500 to S1800.

FIG. 5 is a flow chart briefly showing the process of providing internet resource address information using a dynamic QR code in the second embodiment of the present disclosure.

In the second embodiment, steps S2100 to S2600 may correspond to steps S1100 to S1600 of the first embodiment.

The first customer takes a photo of the first QR code (Q1) generated by the QR Code Management Module (110) using his/her user terminal device (A1). After reading the URL from the captured first QR code (Q1), the user terminal device (A1) sends a protocol request to the QR Code Management Module (110) located at the read URL. (Step S2100)

The QR Code Management Module (110) extracts the URL and the QR code label identification number contained in the received protocol request. (Step S2200)

The QR Code Management Module (110) refers to the QR Code Identification Table (T1), searches for a row with a value matching the extracted QR code label identification number, retrieves the redirection link address information (f2) from the searched row, and forwards the protocol request to the redirection link module (120) located at that address. (Step S2300)

The QR Code Management Module (110) records "TRUE" in the use information (f3) of the searched row in the QR Code Identification Table (T1). (Step S2400)

When "TRUE" is recorded in the use information of the searched row in the QR Code Identification Table (T1), the QR Code Management Module (110) may decline the protocol request sent by the user terminal device. Step S2400 may be executed during or even after steps S2500 to S2700.

The Redirection Link Module (120) extracts the URL and the redirection code information contained in the forwarded protocol request. (Step S2500)

The Redirection Link Module (120) refers to the Redirection Link Table (T2) and searches for the row with a value identical to the extracted redirection code information. The Redirection Link Module (120) then looks up the internet resource address information (g2) from the found row and sends a protocol request to the retrieved internet resource address. (Step S2600)

The Internet Resource System (B) processes the received protocol request and sends the result data or resources held by the Internet Resource System (B) to the user device (A1) of the first customer. (Step S2700)

The QR Code Management Module (110) adds a row containing the generated QR code label identifier, the corresponding redirection link address information, and the usage status information initialized as "FALSE" to the QR Code Identification Table (T1). The QR Code Management Module (110) then creates a QR code containing the generated QR code label identifier and sends the QR code to the user device (A2) of the second customer. (Step S2800)

The redirection link address information corresponding to the generated QR code label identifier may include the address information of the Redirection Link Module (120) that sends protocol requests to the Internet Resource System (B) for the second customer or other customers. Step S2800 may be executed during or before the execution of Steps S2500 to S2700.

Figure 6:
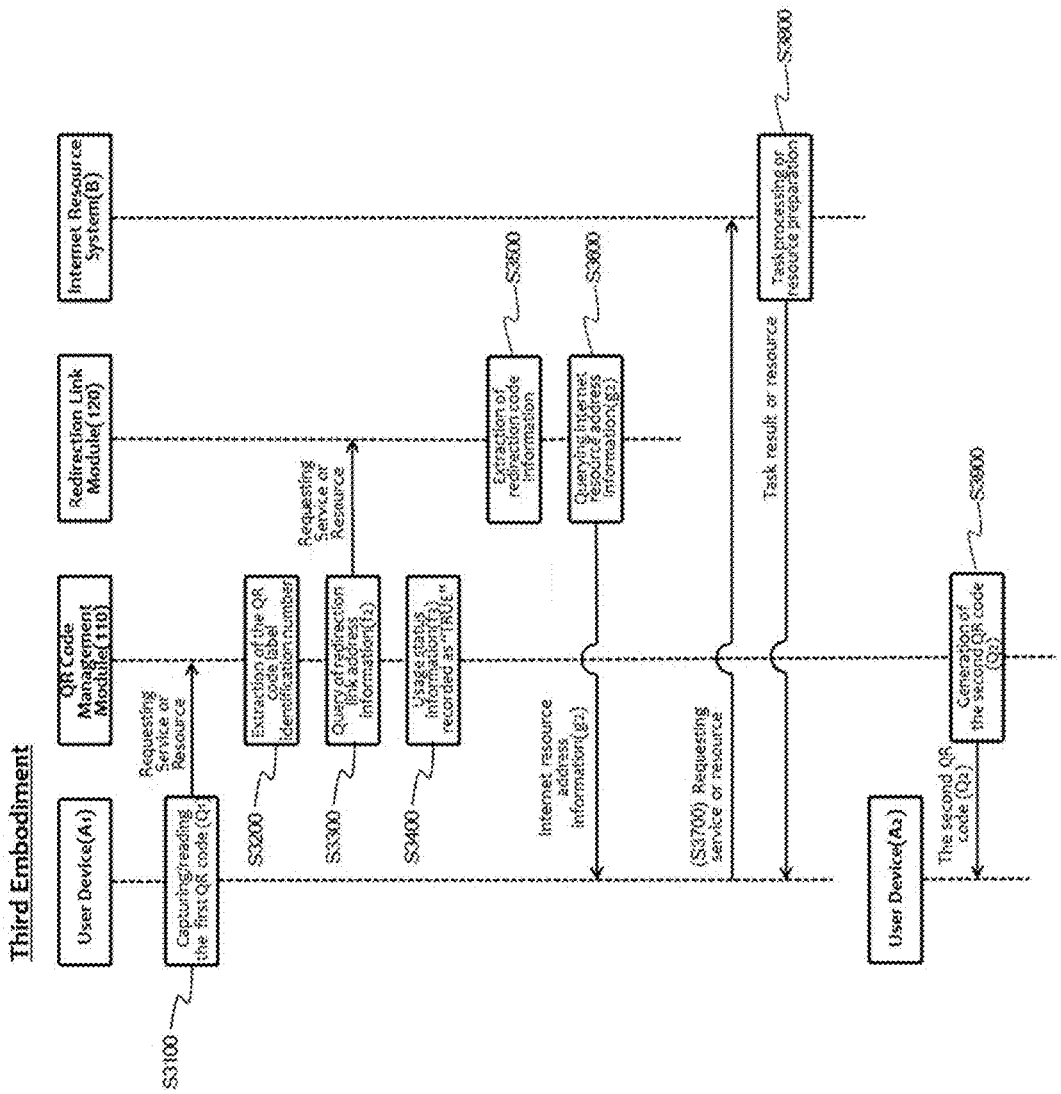
FIG. 6 is a flowchart summarizing the process of providing internet resource address information using a dynamic QR code in the third embodiment of the present disclosure.

FIG. 6 is a flowchart briefly illustrating the process of providing internet resource address information using a dynamic QR code in the third embodiment of the present disclosure.

In the third embodiment, steps S3100 to S3500 may be identical to steps S1100 to S1500 of the first embodiment.

The first customer uses his/her user terminal device (A1) to capture the first QR code (Q1) generated by the QR Code Management Module (110). The user device (A1) reads the URL from the captured first QR code (Q1) and sends a protocol request to the QR Code Management Module (110) located at the read URL. (Step S3100)

The QR Code Management Module (110) extracts the URL and the QR code label identifier included in the received protocol request. (Step S3200)

The QR Code Management Module (110) refers to the QR Code Identification Table (T1) and searches for the row with a value identical to the extracted QR code label identifier. The QR Code Management Module (110) then looks up the redirection link address information (f2) from the found row and forwards the protocol request to the redirection link module (120) located at the corresponding address. (Step S3300)

The QR Code Management Module (110) records the usage status information (f3) as "TRUE" in the found row of the QR Code Identification Table (T1). (Step S3400)

The QR Code Management Module (110) may deny the first protocol request sent by the user device when "TRUE" is recorded in the usage status information of the found row in the QR Code Identification Table (T1). Step S3400 may be executed during or after the execution of Steps S3500 to S8800.

The Redirection Link Module (120) extracts the URL and the redirection code information included in the forwarded protocol request. (Step S3500)

The Redirection Link Module (120) refers to the Redirection Link Table (T2) and searches for the row with a value identical to the extracted redirection code information. The Redirection Link Module (120) then looks up the internet resource address information (g2) from the found row and sends the retrieved internet resource address information (g2) to the user device (A1) of the first customer. (Step S3600)

The user device (A1) of the first customer sends a protocol request to the received internet resource address. (Step S3700)

The internet resource system (B) receives the protocol request, processes the request, and sends the result data or resources held therein to the user device (A1) of the first customer. (Step S3800)

The QR code management module (110) adds a row to the QR code identification table (T1) that includes the created QR code label identification number, the corresponding redirection link address information, and an initialization state set to "FALSE" for usage status. The QR code management module (110) also generates a QR code containing the created QR code label identification number and sends the QR code to an external device (e.g., a terminal installed on a store table or the user device (A2) of the second customer). (Step S3900)

The redirection link address information corresponding to the created QR code label identification number may include the address information of the redirection link module (120) that transmits a protocol request to the internet resource system (B) to provide services to the second customer or another customer. Step S3900 may be executed during or before the execution of Steps S3500 to S3800.

FIG. 7A is a flowchart briefly illustrating the process of providing internet resource address information using dynamic QR codes in the fourth embodiment of the present disclosure, and FIG. 7B briefly depicts the changes in the QR code identification table and redirection link table during the process.

In the fourth embodiment, Steps S4100 to S4300 may be equivalent to Steps S1100 to S1300 in the first embodiment.

The first customer captures the first QR code (Q1) generated by the QR code management module (110) using his/her user terminal device (A1). The user device (A1) reads the URL from the captured first QR code (Q1) and sends a protocol request to the QR code management module (110) located at the read URL. (Step S4100)

The QR code management module (110) extracts the URL and the QR code label identification number contained in the received protocol request. (Step S4200)

The QR code management module (110) references the QR code identification table (T1), searches for a row with the same extracted QR code label identification number, looks up the redirection link address information (f2) from the found row, and forwards a protocol request to the redirection link module (120) located at that address. (Step S4300)

The redirection link module (120) extracts the URL and the redirection code information contained in the received protocol request. (Step S4400)

For instance, the redirection link module (120) may extract the URL "http://myRedirect.com/2001" and extract "2001" as redirection code information from the URL.

The redirection link module (120) refers to the redirection link table (T2), searches for a row with the same extracted redirection code information, looks up the internet resource address information (g2) from the found row, and sends a protocol request to the looked-up internet resource address. (Step S4500)

The internet resource system (B) receives the protocol request, processes the request, and sends the result data or resources held therein to the redirection link module (120). (Step S4600)

The redirection link module (120) sends the data or resources received from the internet resource system (B) to the user device (A1) of the first customer. (Step S4700)

The redirection link module (120) changes the internet resource address information (g2) to a URL for the second customer in the row where the same value as the redirection code information extracted and found in step S4500 is located. (S4800)

For example, when the service for the first customer is provided at the URL "http://otherResourceService/forFirst", and the service for the second customer is provided at the URL "http://otherResourceService/forSecond", the redirection link module (120) may change the internet resource address information (g2) from "http://otherResourceService/forFirst" to "http://otherResourceService/forSecond" when the redirection code information in the redirection link table (T2) is "2001". Unlike the first to third embodiments, the fourth embodiment may reuse the redirection code without discarding the redirection code and update the internet resource address information (g2), so the QR code doesn't need to be changed when switching services. That is, the second customer or another customer may take a photo of the first QR code (Q1) with his/her user terminal device and receive the switched service or resource.

FIG. 8 is a flowchart briefly showing the process of providing the address information of an internet resource using a dynamic QR code in the fifth embodiment of the present disclosure.

Steps S5100 to S5500 in the fifth embodiment may be the same as steps S4100 to S4500 in the fourth embodiment.

The first customer takes a photo of the first QR code (Q1) created by the QR code management module (110) using his/her user terminal device (A1). The user terminal device (A1) reads the URL from the captured first QR code (Q1) and sends a protocol request to the QR code management module (110) located at the read URL. (S5100 step)

The QR code management module (110) extracts the URL and the QR code label identifier included in the received protocol request. (S5200 step)

The QR code management module (110) refers to the QR code identification table (T1), searches for the row with the same value as the extracted QR code label identifier, retrieves the redirection link address information (f2) from the found row, and sends a protocol request to the redirection link module (120) located at that address. (S5300 step)

The redirection link module (120) extracts the URL and the redirection code information included in the received protocol request from the delivered protocol request. (S5400 step)

The redirection link module (120) refers to the redirection link table (T2), searches for the row with the same value as the extracted redirection code information, retrieves the internet resource address information (g2) from the found row, and sends a protocol request to the retrieved internet resource address. (S5500 step)

After receiving the protocol request, the internet resource system (B) processes the request and sends the result data or resources held therein to the first customer's user terminal device (A1). (S5600)

The redirection link module (120) changes the internet resource address information (g2) to a URL for the second customer in the row where the same value as the redirection code information extracted and found in step S5500 is located. (S5700)

FIG. 9 is a flowchart briefly showing the process of providing the address information of an internet resource using a dynamic QR code in the sixth embodiment of the present disclosure.

Steps S6100 to S6400 in the sixth embodiment may be the same as steps S4100 to S4400 in the fourth embodiment.

The first customer takes a photo of the first QR code (Q1) created by the QR code management module (110) using his/her user terminal device (A1). The user terminal device (A1) reads the URL from the captured first QR code (Q1) and sends a protocol request to the QR code management module (110) located at the read URL. (S6100 step)

The QR code management module (110) extracts the URL and the QR code label identifier included in the received protocol request. (S6200 step)

The QR code management module (110) refers to the QR code identification table (T1), searches for the row with the same value as the extracted QR code label identifier, retrieves the redirection link address information (f2) from the found row, and sends a protocol request to the redirection link module (120) located at that address. (S6300 step)

The redirection link module (120) extracts the URL and the redirection code information included in the received protocol request from the delivered protocol request. (S6400 step)

The redirection link module (120) refers to the redirection link table (T2), searches for the row with the same value as the extracted redirection code information, retrieves the internet resource address information (g2) from the found row, and sends the retrieved internet resource address information (g2) to the first customer's user terminal device (A1). (S6500 step)

The first customer's user terminal device (A1) sends a protocol request to the received internet resource address. (S6600 step)

The Internet Resource System (B) receives the protocol request, processes the task according to the request, and then sends the resulting data or resources held by the Internet Resource System (B) to the first customer's user terminal (A1). (Step S6700)

The redirection link module (120) changes the Internet resource address information (g2) to a URL for the second customer in the row where the same value as the extracted redirection code information found in step S6500 is located. (Step S6800)

Although the embodiments of the present disclosure have been described above, the present disclosure is not limited to the described embodiments. As long as it does not deviate from the spirit of the present disclosure and does not impair its effect, it may be variously modified and practiced within the detailed description of the present disclosure and the scope of the attached drawings. It is also natural that such embodiments fall within the scope of the present disclosure.

DESCRIPTION OF REFERENCE NUMERALS

100: System for providing Internet resource address information using dynamic QR codes
110: QR code management module
120: Redirection link module

What is claimed is:

1. A method for providing Internet resource address information using a dynamic QR (Quick Response) code, the method comprising:
   receiving, by a QR code management module, a first protocol request and extracting a QR code label identification number included in a first URL from the received first protocol request;
   forwarding, by the QR code management module, a second protocol request to a redirection link module after looking up redirection link address information from a QR code identification table using the QR code label identification number as a search key;
   extracting, by the redirection link module, redirection code information included in a second URL from the forwarded second protocol request; and
   looking up, by the redirection link module, Internet resource address information from redirection link table using the extracted redirection code information as a search key,
   wherein the QR code management module refers to the QR code identification table to search for a row containing a value identical to the extracted QR code label identification number, looks up the redirection link address information from the searched row, and forwards the second protocol request to the redirection link module located at the looked-up redirection link address information,
   wherein the QR code management module checks the usage status information from the searched row in the QR code identification table, records the usage status information as "TRUE" and forwards the second protocol request to the redirection link module when the checked usage status information is "FALSE", and rejects the first protocol request sent by the user terminal device when the checked usage status information is "TRUE", and
   wherein the QR code management module generates a QR code label identification number, adds a row to the QR code identification table which includes the generated QR code label identification number, the corresponding redirection link address information, and the usage status information initialized as "FALSE".

2. The method of claim 1, wherein a user terminal device captures a QR code storing the first URL, reads the first URL, and sends the first protocol request to the QR code management module located at the read first URL.

3. The method of claim 1, wherein the QR code management module generates and sends a QR code which contains the generated QR code label identification number to an external terminal device.

4. The method of claim 1, wherein the redirection link module refers to the redirection link table to search for a row containing a value identical to the extracted redirection code information and looks up the Internet resource address information from the searched row.

5. The method of claim 1, wherein the redirection link module modifies the Internet resource address information in the searched row of the redirection link table.

6. The method of claim 1, wherein the redirection link module sends the looked-up Internet resource address information to the user terminal device.

7. A system for providing Internet resource address information using a dynamic QR (Quick Response) code, the system comprising:
   a QR code management module that extracts a QR code label identification number included in a first URL from a first protocol request received from a user terminal device, and looks up redirection link address information from a QR code identification table using the QR code label identification number as a search key; and
   a redirection link module that extracts redirection code information included in a second URL from a second protocol request forwarded from the QR code management module, and looks up Internet resource address information from a redirection link table using the redirection code information as a search key,
   wherein the QR code management module refers to the QR code identification table to search for a row containing a value identical to the extracted QR code label identification number, looks up the redirection link address information from the searched row and forwards the second protocol request to the redirection link module located at the looked-up redirection link address information, checks the usage status information from the searched row of the QR code identification table, records the usage status information as "TRUE" and forwards the second protocol request to the redirection link module when the checked usage status information is "FALSE", and rejects the first protocol request sent by the user terminal device when the checked usage status information is "TRUE", and
   wherein the QR code management module generates a QR code label identification number, adds a row to the QR code identification table that includes the generated QR code label identification number, the corresponding redirection link address information, and the usage status information initialized as "FALSE".

8. The system of claim 7, wherein the QR code management module generates and sends a QR code which contains the generated QR code label identification number to an external terminal device.

9. The system of claim 7, wherein the redirection link module refers to the redirection link table to search for a row containing a value identical to the extracted redirection code information, looks up the Internet resource address information from the searched row, and modifies the Internet resource address information in the searched row of the redirection link table.

10. The system of claim 7, wherein the redirection link module sends the looked-up Internet resource address information to the user terminal device.

\* \* \* \* \*